United States Patent [19]

Oxenreider et al.

[11] 4,168,350
[45] Sep. 18, 1979

[54] EXPLOSION RESISTANT BATTERY COVER DESIGN

[75] Inventors: Terry R. Oxenreider, Wernersville; Joseph I. Heiser, Wyomissing Hills, both of Pa.

[73] Assignee: General Battery Corporation, Reading, Pa.

[21] Appl. No.: 854,054

[22] Filed: Nov. 23, 1977

[51] Int. Cl.$^2$ ............................................. H01M 2/12
[52] U.S. Cl. ......................................... 429/87; 429/89
[58] Field of Search ...................... 429/82, 86, 87, 88, 429/89

[56] References Cited

U.S. PATENT DOCUMENTS

| | | | |
|---|---|---|---|
| 2,890,262 | 6/1959 | Kendall et al. | 429/88 |
| 3,161,548 | 12/1964 | Goldingay | 429/88 |
| 3,360,403 | 12/1967 | Halsall | 136/170 |
| 3,366,271 | 1/1969 | Thompson | 220/33 |
| 3,508,972 | 4/1970 | Goldingay | 136/170 |
| 3,666,564 | 5/1972 | Corbin et al. | 429/88 |
| 3,708,348 | 1/1973 | Painter et al. | 429/88 |
| 3,802,597 | 4/1974 | Miller | 429/88 |
| 3,904,441 | 9/1975 | Badter | 136/177 |
| 3,992,226 | 11/1976 | Godshalk | 429/89 |
| 4,010,044 | 3/1977 | Schaumburg | 429/82 |
| 4,031,294 | 6/1977 | Sano | 429/82 |
| 4,037,030 | 7/1977 | Sabatino | 429/139 |

FOREIGN PATENT DOCUMENTS 1042678 11/1958 Fed. Rep. of Germany ............ 429/88

OTHER PUBLICATIONS

Bureau of Mines, Bulletin 514, American Standard Safety Code for Installing and Using Electrical Equipment in and about Coal Mines (M2.1), pp. 5 and 6, (1952).

Bureau of Mines Circular 8227, American Standard Safety Code for Installing and Using Electrical Equipment in and about Coal Mines (M2.1), p. 6; The Quenching of Laminar Oxhydrogen Flames by Solid Surfaces, by Raymond Friedman; Third Symposium on Combustion, Flame, and Explosion Phenomena, William & Wilkins Co., 1949.

Survey of Hydrogen Combustion Properties by Isadore L. Drell, et al, Lewis Flight Propulsion Laboratory, Cleveland, Ohio, 1958.

Primary Examiner—Donald L. Walton
Attorney, Agent, or Firm—Benasutti Associates, Ltd.

[57] ABSTRACT

A maintenance free battery having explosion resistant characteristics for multi-celled battery containers. A battery cover has a main body with an elongate recess therein extending across its length. Within the first recess there are a plurality of vent well openings extending into the cells of the battery, and a plurality of vent plugs filling each opening which provide for the escape of gas and retard the escape of electrolyte. A recess plate fits snugly within the recess, the plate attaching to each of the vent plugs. Provisions are made to insure that the ends of the plate seal off the ends of the recess to prevent the leakage of gas between the plate ends and recess end walls.

7 Claims, 6 Drawing Figures

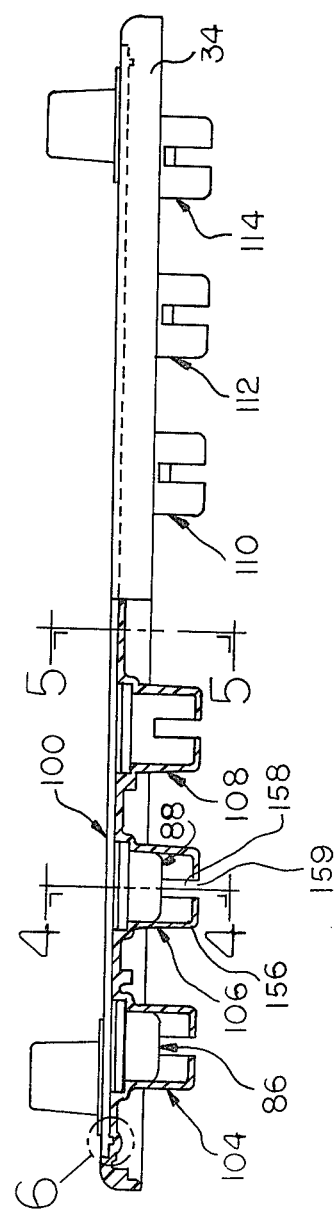

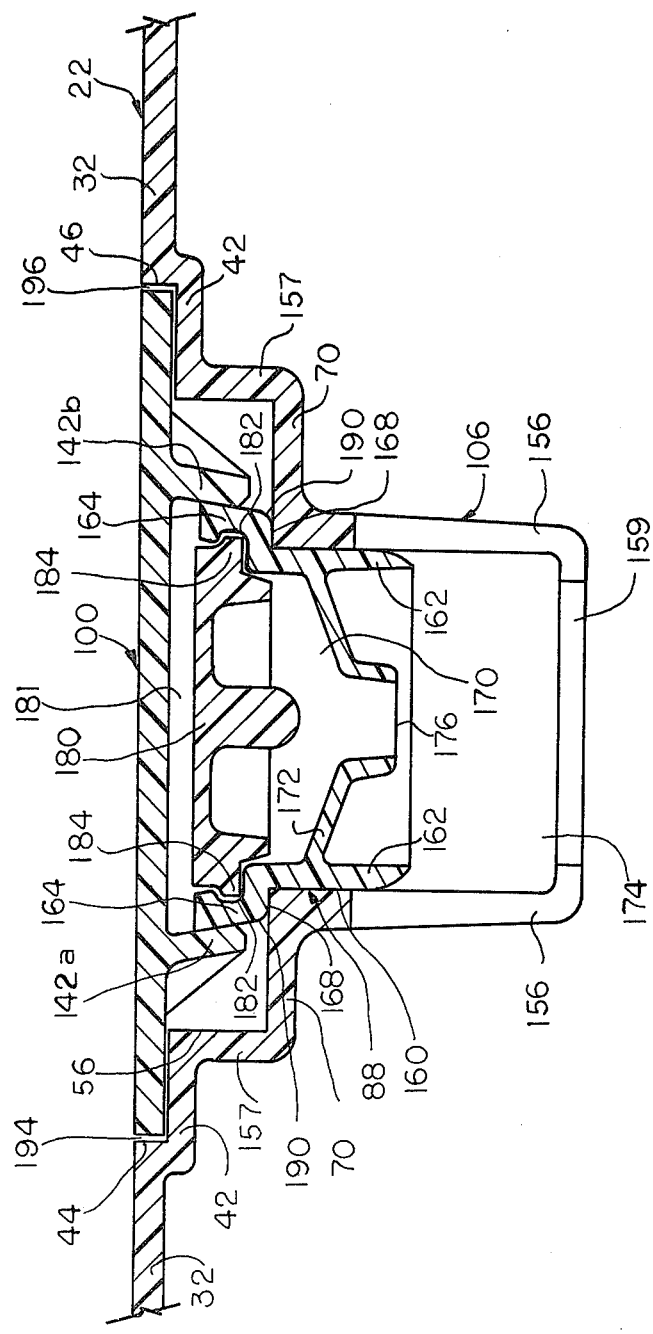

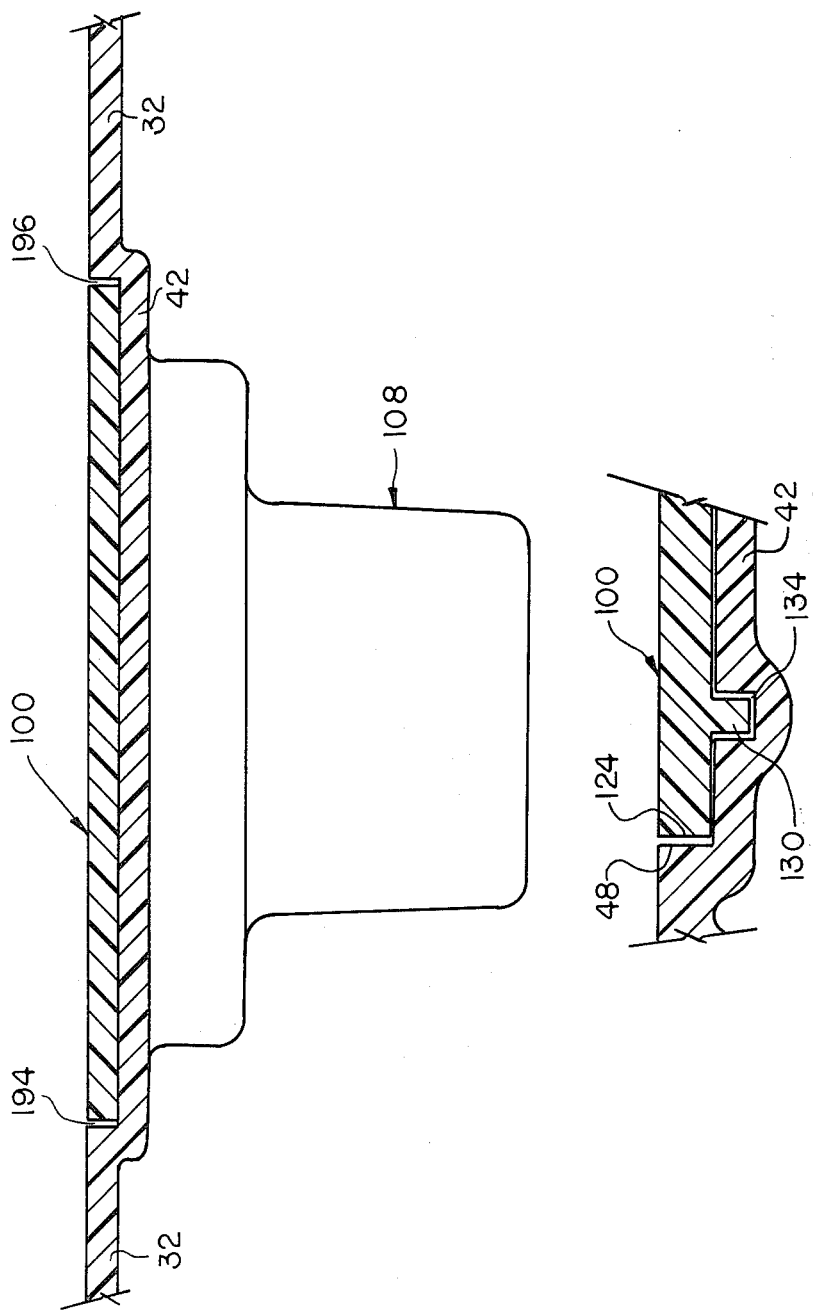

EXPLOSION RESISTANT BATTERY COVER DESIGN

BACKGROUND OF THE INVENTION

This invention relates to explosion resistant covers for battery containers.

Storage batteries generate internal gases when in use and these gases, such as hydrogen and oxygen, are usually vented to the ambient atmosphere in order to relieve internal battery pressure. However, this venting of gases can create an explosion hazzard if a spark occurs near the battery when the gas is being discharged. The spark ignites the gas, and the flame or spark travels back into the battery whereupon the battery explodes. Hence, it is desirable to provide a battery cover design and battery which eliminates or minimizes these explosions.

It is desirable also to provide a maintenance free battery cover design which provides a flat battery top surface but which allows continuation of existing manufacturing techniques for the battery case and filling of the battery with electrolyte while at the same time allowing for venting of gases without the hazard of explosion as aforementioned.

Examples of patents relating to anti-explosion battery vents and caps are the Godshalk Patent, U.S. Pat. No. 3,992,226 entitled, "Anti-Explosion Cap For Storage Batteries", and the Schaumburg patent, U.S. Pat. No. 4,010,044 entitled, "Battery Vent".

With respect to maintenance free cover designs, the Badger patent, U.S. Pat. No. 3,904,441 entitled, "Battery Vent Construction", at column 2, relates to a battery cover which has a longitudinal channel extending across its length with a plurality of spaced apart apertures each leading to a battery cell. An elongate acid proof gasket having a plurality of openings is positioned to coincide with the apertures in the cover and is adhesively bound to the middle of the channel. A strip of micro-porous filter material is adhesively secured to a rigid elongate guard which extends along the length of the battery cover within the channel. The guard is equipped with a plurality of spaced apart platforms or spacers which are adhesively secured to the adjacent gasket to hold the guard in place. The guard is equipped with a continuous downwardly extending lip on both ends and sides of the guard. Gas is allowed to escape from the battery through the micro-porous material and spaces between the platforms or spacers and then out between the guard lip and side walls of the channel.

The Miller patent, U.S. Pat. No. 3,802,597 entitled, "Battery Container Cover", discloses a cover body formed with a row of well portions sunk below the top plane of the cover. Each well portion defines a cell opening closed by a vent plug. A flat cover strip is sealed over the well portions so as to be substantially contiguous with the top cover surface. The cover strip is fitted onto a ledge formed in the cover body below the upper surface of the cover. A plurality of spaced lugs are formed in the ledge defining fusing points for securing the strip on to the body. The strip is slightly smaller than the outer periphery of the ledge. The strip is centered on the ledge and pressed and sealed in place at the locations of the lugs. Gas escapes through the well portions and beneath and around the edges of the cover strip. This is described in column 2 of the patent.

Also, the Sabatino patent U.S. Pat. No. 4,037,030 is directed to a maintenance free battery.

Some battery manufacturers provide a battery cover with an elongate channel along its length having a plurality of spaced apart vent wells in the channel opening into the battery cells. Vent caps are provided to fill each well which allow gas to escape but prevent electrolyte from splashing out of the battery. A cover strip which fits within the channel is provided which firmly attaches to each of the caps. The strip is provided with a plurality of pairs of curved projections which extend from the underside of said strip. Each projection of each pair is disposed to mate with opposite sides of the curved periphery of a corresponding vent cap. The projections extend generally perpendicular from the strip. Each projection of each pair is equipped with a ledge on the concave face of the projection. This ledge is disposed to snap within a corresponding groove surrounding each vent cap. Thus, when the ledges of each pair are in place around a corresponding vent cap, the strip becomes locked in place in the channel. The vent caps engage two parallel line projections which run down the center of the strip on the underside. The vent caps are free to rotate because the grooves surround the cap but the strip cannot be easily removed from the caps.

SUMMARY OF THE INVENTION

Applicants' invention comprises a battery with a cover design for a battery container which contains a plurality of cells, which cover provides a maintenance free appearance and explosion resistant characteristics. At the same time, the cover design does not require significant changes to the battery manufacturing process. Applicants' invention includes not only an improved battery cover but the cover in combination with the battery container.

The cover comprises a main body which mates with the battery container walls and cellular partitions. For example, with standard plastic battery cases and covers, grooves are placed within the cover to receive the tops of the walls and cellular partitions being located in a single plane. In the preferred embodiment of applicants' invention, an elongate recess is present in the main body which runs along its length. The cover further comprises a plurality of vent wells disposed within the recess which open into the interior of the cells. In the preferred embodiment, each one of the wells is located within a second recess which is located within the first elongate recess. There are a plurality of these second recesses to correspond to the plurality of vent wells. Each well further comprises well walls which extend from the bottom of the second recess into the battery.

A recess cover plate fits within the first elongate recess and seals the ends of the recess. The width of the plate is made such that any gap which might exist between a side wall of the recess and a side of the plate will be between 0.000 inches and 0.005 inches inclusive in width. Even though the plate is designed to fit snugly within the recess, the above tolerances result because of imprecision in manufacturing, particularly in plastic molding. However, gas cannot be allowed to escape between the end walls of the recess and the ends of the plate since the explosion resistant characteristics of the cover design depend on a good seal being maintained there. To overcome the gaps which might occur because of imprecision in manufacturing mentioned above, in the preferred embodiment, a tongue and groove-like construction is applied to the plate and recesses near the ends in the form of a groove adjacent each end of the recess located in the floor or bottom of the recess, and a projection which is adjacent to each end of the recess cover plate and which is disposed to mate with the groove in the recess to provide a sealing means for sealing the ends of said recess against the escape of gas from within said battery and recess. In the preferred embodiment, the grooves are parallel to the ends of the recess and the projections are parallel to the ends of the plate.

Vent caps are provided to cap each of the vent wells. They can be of conventional design, or for added explosion resistant characteristics, of an anti-explosion design. In the preferred embodiment, a first portion of the cap is disposed within the vent well preferably with this first portion engaging the inside walls of the vent well portion extending into the battery cell. The cap comprises a second portion attached to the first portion, preferably integrally formed with the first portion, the second portion being located above the bottom of the recess floor. In the preferred embodiment, the first elongate recess contains a plurality of second recesses and the second portion of the caps engage the bottoms of the second recesses. The second portion of the cap has a larger diameter than the diameter of the opening and allows the cap to sit on the floor of the recess.

Attachment means for removably attaching said plate to at least one of said vent caps is provided in the form of at least one pair of tabs which are attached to the underside of the recess cover plate. Preferably, the plate is equipped with a plurality of pairs of such tabs to mate with each of the vent caps in the plurality of cells. Each of the pairs of tabs slidingly engage opposite sides of the second portion of the vent cap.

To insure a positive fit between the tabs and the cap and to insure that the attachment of the plate to the cover will withstand the pressure which results from the generation of gases within the battery, the second portion of the cap is tapered away from the axis of the cap and the floor of the recess, the diameter of the second portion increasing as the distance from the recess floor increases. The tabs on the plate are tapered to slidingly engage with the taper on the second portion of the cap. The taper tab surface which engages the taper surface of the second portion of the cap is also slightly curved to conform with the curved nature of the vent cap in the preferred embodiment.

In the preferred embodiment, the first elongate recess is rectangular in shape as is the plate which fits within it.

An object of the applicants' invention is to provide a maintenance free cover design for battery containers having anti-explosion characteristics.

Another object of applicants' invention is to provide a maintenance free cover design which allows ready access to the battery vent well should the need arise.

This and other objects of my invention will become apparent from the following description with reference to the accompanying drawings.

BRIEF DESCRIPTION OF THE DRAWINGS

FIG. 2 is a slightly enlarged elevational view of the preferred embodiment battery cover of FIG. 1 taken along the lines and arrows 2—2 in FIG. 1 and showing the battery cover in partial cross section.

FIG. 3 is an enlarged bottom view of the preferred embodiment recess plate of FIG. 1.

FIG. 4 is a greatly enlarged cross-sectional view of the preferred embodiment battery cover of applicants' invention taken along the lines and arrows 4—4 in FIG. 2.

FIG. 6 is a greatly enlarged view of a portion of the preferred embodiment of applicants' invention enclosed by the circle 6 in FIG. 2.

DESCRIPTION OF THE PREFERRED EMBODIMENTS

Figure 1:
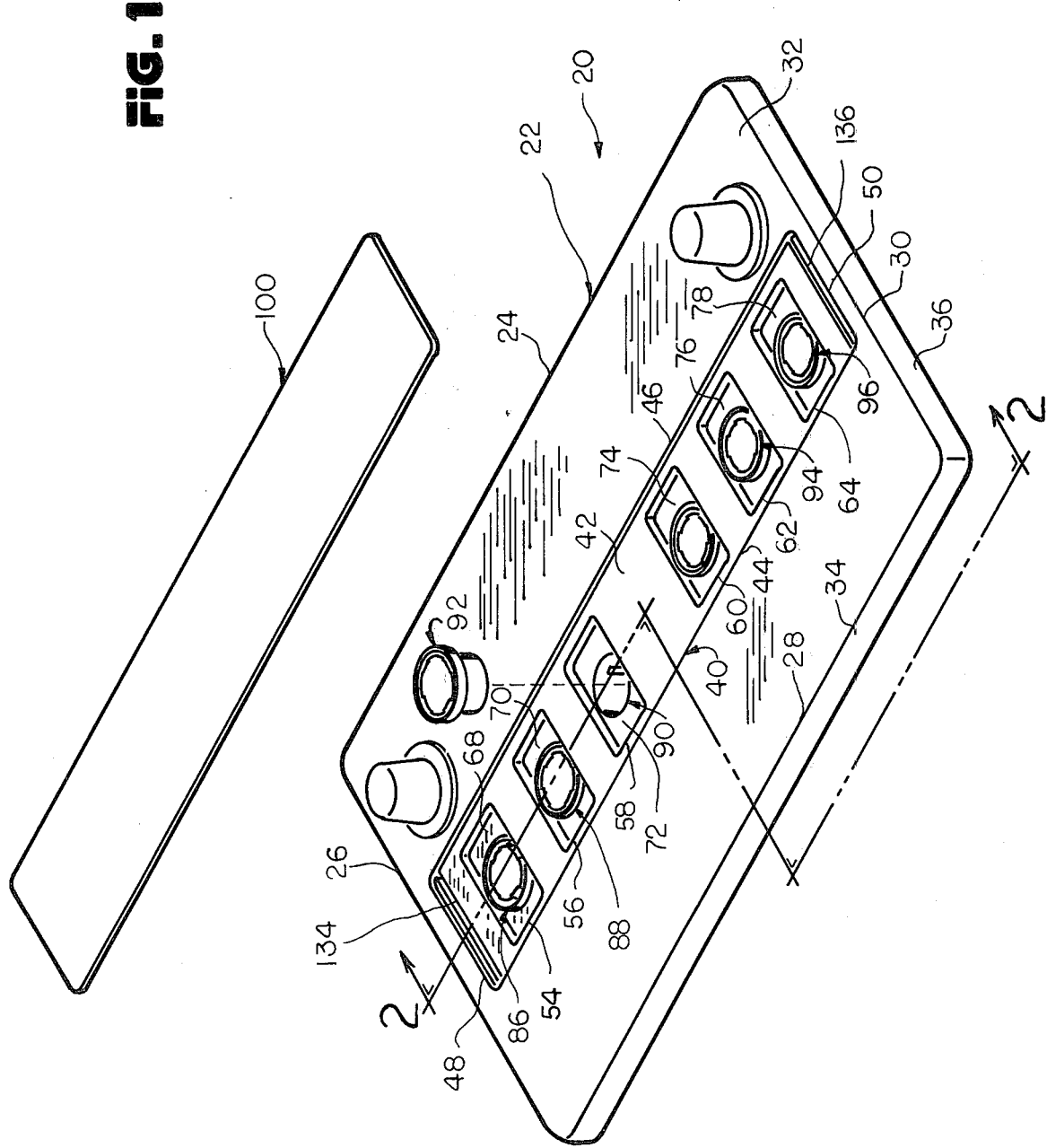
FIG. 1 is a perspective view of the preferred embodiment battery cover of applicants' invention with the recess plate shown separate from the remainder of the cover.

Although specific forms of the invention have been selected for illustration in the drawings, and the following description is drawn in specific terms for the purpose of describing these forms of the invention, this description is not intended to limit the scope of the invention which is defined in the appended claims.

Referring to the figures, FIG. 1 shows a cover designated generally 20 for use with a multi-celled battery container. The container has side walls and cellular partitions running between two opposite side walls. The battery container is not shown in the drawings but is of conventional design well known to one skilled in the art.

The cover comprises a main body designated generally 22 which is adapted to mate with the battery container side walls and cellular partitions. For example, the main body 22 may be equipped with grooves around the periphery to accept the relatively thin side walls as well as grooves which run transverse to the longest side of the main body to accept the cellular partition walls.

Main body 22 is, in the preferred embodiment, rectangular in shape having sides 24 and 28, ends 26 and 30, and top surface 32. Flanges extend away from the top surface 32 at the sides and ends; only two flanges 34 and 36 run at side 28 and end 30 respectively are shown in the perspective view of FIG. 1.

An elongate first recess designated generally 40 is defined in the main body by first recess bottom 42; first recess side walls 44 and 46; and first recess end walls 48 and 50. The first recess in the preferred embodiment is generally rectangular in shape, and first recess bottom 42 is planar and parallel and spaced apart from the top surface 32, which is also planar in the preferred embodiment.

In the preferred embodiment, the cover 20 further comprises a plurality of second recesses 54, 56, 58, 60, 62 and 64 defined in the first recess bottom 42. Each recess has a plurality of side walls and a bottom 68, 70, 72, 74, 76 and 78, which bottoms are parallel and spaced apart from both the first recess bottom 42 and the main body top surface 32.

Each second recess has an opening through its bottom which provides access to the interior of each battery cell when the cover is sealed to a battery case. For example, in FIG. 1, second recess 60 shows opening 82. Each of the second recesses is equipped with a vent well, that is, an opening with vent well walls. For example, in FIG. 1, only opening 82 is clearly visible. In FIG. 1 the remaining vent wells are filled with vent caps designated generally 86, 88, 90, 94 and 96. The vent cap designated generally 92 for opening 82 is shown positioned above the cover 20 in FIG. 1.

Finally, the cover comprises a recess cover plate designated generally 100 which fits with extremely close tolerance into the first recess. The plate 100 is disposed to completely seal the ends of the recess when it is in place. This seal prevents the gases which may be generated within the battery and trapped in the recesses beneath the cover plate from escaping through the ends of the first elongate recess.

FIG. 2 is a side view of the cover of FIG. 1 with the plate 100 in place in the first recess; a portion of the view is taken in cross section. Vent wells designated generally 104 through 114 are shown in FIG. 2 extending from the main body 22 of the cover into the battery interior. The vent wells are disposed in the second recesses of the main body. Vent caps designated generally 86 and 88 are shown filling the vent wells 104 and 106 respectively. Vent well 108 is shown without a cap.

The underside of preferred embodiment 100 is shown in FIG. 3. The rectangular plate has side walls 120 and 122 and end walls 124 and 126. Adjacent and, in the preferred embodiment, parallel to end walls 124 and 126 are straight projections 130 and 132. These projections extend from the underside of plate 100 and fit into or mate with corresponding grooves in the bottom 42 of the first recess 40. These grooves 134 and 136 can be seen in FIG. 1.

Also shown in FIG. 3 are attachment means for removably attaching the plate 100 to the vent caps 86–96. The attachment means comprises a pair of tabular projections or tabs 140a–b through 150a–b which extend from the underside of plate 100. Each pair of tabs is disposed to slidingly engage opposite portions of a portion of a corresponding vent cap such as tabs 140a–b and vent cap 86; tabs 142a–b and vent caps 88 and so on. Conventional design vent well openings and vent caps to fill them are circular in cross-section, and each tab has a curved surface 152 to mate with a curved portion of each vent cap.

FIG. 4 shows the design and placement of the vent cap disposed in a vent well as well as the attachment of the plate to the caps.

Vent well 106 has a cylindrical wall 156, a portion of which is shown in FIG. 4. An elevational cross-sectional view of the wall 156 is shown in FIG. 2 with a slot 158 contained therein which opens to the interior of the battery allowing gas to pass into the hollow of the well from the battery. The wall 156 is connected to the bottom 70 of recess 56. The bottom 70 joins with the vent wall 156 at near right angles in the preferred embodiment. The bottom 70 joins the vertical wall 157 of the recess 56 which in turn joins the bottom 42 of the first recess 40. Finally, side walls 44 and 46 of the first recess join bottom 42 to top surface 32 of the main body 22. Each of the remaining vent wells 86 and 90–96 are similarly constructed. In conventional plastic case batteries, the entire structure just described is molded as one piece.

The vent cap 88 comprises main body 160 having a first cylindrical wall portion 162 which fits within the well 106 and in the preferred embodiment engages the inner surface of wall 156. Wall portion 162 joins with a second cylindrical portion 164 which is concentric with wall portion 162 but wider in diameter. Because it is wider in diameter, it engages second recess bottom 70 along surface 168 as the main body 160 is inserted into the well. The opening or hollow region 170 enclosed by cylindrical wall 162 is partially closed off by transverse wall 172. Communication between the hollow region 174 enclosed by wall 156 and hollow region 170 is provided by aperture 176 in transverse wall 172.

The cap 88 also comprises cap portion 180 which snaps into place in a groove 182 contained with cylindrical wall portion 164. The cap portion 180 has a projection 184 which surrounds the cap portion and fits within groove 182.

Gas generated within the battery will pass into hollow region 174 through slot 158 of FIG. 2 and opening 159 of FIG. 4. From there gas passes into hollow region 170 through aperture 176 and from there out the top of the cap through the space between cap portions 180 and cylindrical wall portion 164 at groove 182 and projection 184.

The outer surface 190 of the cylindrical portion 164 of cap 88 is tapered outward from the axis of the cap and away from surface 168 where main body portion 160 engages recess bottom 70. The diameter of the outer surface 190 increases the farther the upper cylindrical portion 164 extends from the recess bottom 70.

The pair of tabs 142a and 142b of FIG. 3 are shown in cross-section in FIG. 4 in sliding engagement with opposite portions of the tapered surface 190 of upper cylindrical portion 164 of cap 88. The curved tabular portions 152 are seen to be tapered to complimentarily engage the tapered surface 190. When the tabs are in place engaging the caps, each pair is tapered toward the axis of each cap. Hence, the plate 100 though the tabs 140a–b through 150a–b is held to the main body 22 by attachment to the caps 86–96 in the manner described above. It is possible that only one or two such attachments are required but three, four, or five would be better. In the preferred embodiment, as seen in FIG. 3, the plate is equipped with six pairs of tabs to attach to six vent caps. In this way, the plate is held securely by six periodic attachment points along its entire length.

Figure 5:
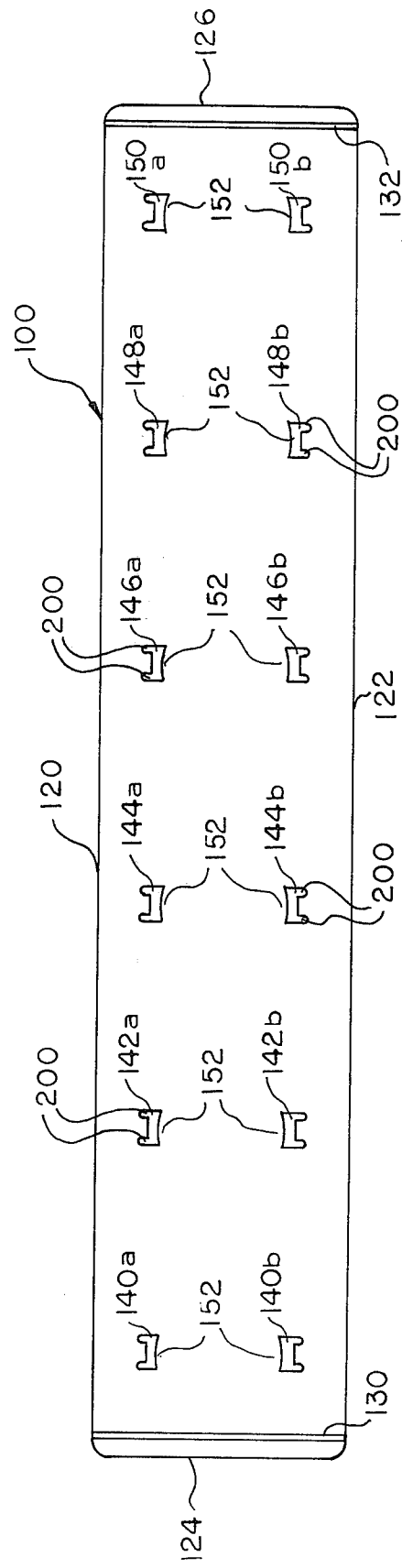
FIG. 5 is a greatly enlarged cross-sectional view of the preferred embodiment of applicants' invention taken along the lines and arrows 5—5 in FIG. 2.

FIG. 5 is a cross-section of the plate 100 and main body 22 taken between vent wells. It illustrates how the cover plate 100 lies flat on surface 42 along its entire width. It is desirable to provide a plate which fits the first recess exactly along the sides. However, in practice this is not always possible and a tolerance is allowed on the relative sizes of the first recess width and the plate width such that the slots 194 and 196 of FIGS. 4 and 5 are less than or equal to 0.005 inches or between 0.000 inches and 0.005 inches inclusive. FIG. 4 illustrates that the plate 100 lies flat on bottom 42 on either side of the second recess such as recess 56 as well as lying flat on the bottom 42 between each of the recesses as in FIG. 5.

As the gas generated within the battery passes through the vent cap, it is captured beneath the plate 100 between the plate 100 and second recess bottoms 68 through 78. See FIG. 1. As best seen in FIG. 4, as gas pressure builds in region 181, the plate 100 lifts or bulges in the center, and the tabs pairs such as 142a and 142b grab or press against portions of the tapered surface 190 of the upper portion of the cap 88. This acts to hold the plate in place with respect to the caps and recess 40. To prevent the tab portion 152 from buckling or distorting and loosing contact with the cap when under pressure, each of the tabs comprise a support portion connected between the tab portion 152 and the underside of the plate 100. In the preferred embodiment, the support portion comprises a member 200 in FIG. 3 connected to the tab portion 152 at each end of the portions 152 and extending generally perpendicularly therefrom along the underside of plate 100 and connected thereto. At the same time gas may escape through any space that occurs between the sides 120 of plate 100 and side wall 44 of recess 40 and similarly between side 122 and side wall 46. See FIGS. 1 and 3. When this occurs, the pressure is thus relieved and the nature of the tapered engagement between the tabs 140a-b through 150a-b and the tapered second cylindrical portion of the caps such as that described in FIG. 4 for vent cap 88 draws the plate back into position.

However, even though the tolerances are such that a space between side walls 44 and 46 and plates sides 120 and 122, respectively, may occur somewhere along their lenghts, it is important to the explosion resistant nature of the cap that no such space occur at the ends of the recess and plate to allow gas to leak therefrom. FIG. 6 shows in detail the nature of the engagement between the ends 124 and 126 of the plate 100 with the end wall portions 48 and 50, respectively, of the first recess 40. To insure a good seal along the ends, the projections 130 and 132 are disposed to fit within grooves 134 and 136. Projection 132 and groove 136 are not shown in FIG. 6. Even though some gap may occur between end wall 48 and plate end 124, gas will not be able to escape because of the double protection of the seating of plate 100 on the bottom 42 of first recess 40, and because of the seating of projection 130 and groove 134. Should distortion occur in the plate 100 due to gas pressure build-up to thereby distort the plate 100 at its ends, then the projection 130 will move to contact a wall in the groove 134 to seal off the end forcing the gas out between the sides.

It will be understood that various changes in the details, materials and arrangement of parts which have been herein described and illustrated in order to explain the nature of this invention may be made by those skilled in the art within the principle and scope of the invention as expressed in the following claims.

It will be further understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. A cover for a battery container having a plurality of cells, said cover comprising:
   (a) a main body which mates with the walls and cellular partitions of said container and which has an elongate recess defined therein and at least one vent well disposed in said recess, said well opening into said battery container;
   (b) at least one vent cap engaging said vent well; and
   (c) a recess cover plate fitted within said recess having cover plate attachment means for removably attaching said plate to at least said vent cap, said attachment means comprising at least one pair of tapered tabs connected to said plate, said pair of tapered tabs slidingly engaging opposing, tapered surface portions of at least one of said caps, said tapered tabs and said tapered surface portions coacting to draw said plate towards said vent cap.

2. The invention of claim 1 wherein each of said tapered tabs comprises a support portion extending between said tab and the underside of said plate.

3. The invention of claim 2 wherein each of said tabs comprises a plurality of said support portions.

4. A cover for a battery container having a plurality of cells, said cover comprising:
   (a) a main body which mates with the walls and cellular partitions of said container having an elongate first recess defined therein, said first recess including a plurality of grooves defined at opposing ends of said recess;
   (b) a plurality of spaced apart second recesses defined in said main body to communicate with said first recess;
   (c) a plurality of vent wells defined in said main body for providing fluid communication between the interior of said container and each of said second recesses;
   (d) a plurality of vent caps engaging said vent wells, at least one of said vent caps including a tapered portion; and
   (e) a recess cover plate which fits within said first recess, said plate including:
      (i) projections at each end thereof to mate with said grooves to seal the ends of said recess against the escape of gas from the ends of said recess; and
      (ii) attachment means for removably attaching said plate to each of said vent caps, said attachment means comprising at least one pair of tapered tabs projecting from said plate, each of said pairs slidingly engaging opposing portions of said tapered portion of at least one of said vent caps to draw said plate towards said vent cap.

5. The invention of claim 4 wherein at least one of said grooves is parallel and spaced apart from said end of said recess, and at least one of said projections is parallel and spaced apart from said end of said plate.

6. The invention of claim 5 wherein said first recess and said plate are rectangular.

7. The invention of claim 6 wherein each of the sides of said plate are spaced apart from the side walls of said first recess by a distance which is less than 0.005 inch.

* * * * *